United States Patent
Matsumura

(10) Patent No.: US 11,030,391 B2
(45) Date of Patent: Jun. 8, 2021

(54) DOCUMENT CREATION SUPPORT SYSTEM

(71) Applicant: GRACE TECHNOLOGY, INC., Tokyo (JP)

(72) Inventor: Yukiharu Matsumura, Tokyo (JP)

(73) Assignee: GRACE TECHNOLOGY, INC., Tokyo (JP)

( * ) Notice: Subject to any disclaimer, the term of this patent is extended or adjusted under 35 U.S.C. 154(b) by 2 days.

(21) Appl. No.: 16/496,747

(22) PCT Filed: Jun. 24, 2019

(86) PCT No.: PCT/JP2019/024897
§ 371 (c)(1),
(2) Date: Sep. 23, 2019

(87) PCT Pub. No.: WO2020/039729
PCT Pub. Date: Feb. 27, 2020

(65) Prior Publication Data
US 2020/0410156 A1   Dec. 31, 2020

(30) Foreign Application Priority Data
Aug. 24, 2018   (JP)   .............................. JP2018-157281

(51) Int. Cl.
*G06F 40/131*   (2020.01)
*G06F 16/27*   (2019.01)
(Continued)

(52) U.S. Cl.
CPC ............ *G06F 40/131* (2020.01); *G06F 16/22* (2019.01); *G06F 16/2358* (2019.01);
(Continued)

(58) Field of Classification Search
None
See application file for complete search history.

(56) References Cited

U.S. PATENT DOCUMENTS 7,611,466 B2 * 11/2009 Chalana ............... A61B 8/0858
382/128
8,078,611 B2 * 12/2011 Agarwal ............. G06F 16/8373
707/719
(Continued)

FOREIGN PATENT DOCUMENTS

JP   2001331481 A   11/2001
JP   2007535749 A   12/2007

OTHER PUBLICATIONS

Office Action dated Dec. 11, 2018 for the corresponding Japanese Patent Application No. 2018-157281.
(Continued)

*Primary Examiner* — Howard Cortes
(74) *Attorney, Agent, or Firm* — Rankin, Hill & Clark LLP

(57) ABSTRACT

To provide a document creation support system that facilitates translation work.

A manual creation support server replicates node information of a document in a first language as the node information of the document in a second language, and correspondingly copies a part defined in the node information as the part in the second language. In addition, when the part is updated, notification related to the update of parts in other languages corresponding to the part is performed. Furthermore, based on a part in a part management table 440 and node information of a manual management table 420, XML data in which the part is structured is generated, and a manual is generated based on the generated XML data and a layout template.

5 Claims, 13 Drawing Sheets

(51) Int. Cl.
*G06F 16/22* (2019.01)
*G06F 16/93* (2019.01)
*G06F 16/23* (2019.01)
*G06F 40/42* (2020.01)
*G06F 40/186* (2020.01)

(52) U.S. Cl.
CPC .............. *G06F 16/27* (2019.01); *G06F 16/93* (2019.01); *G06F 40/186* (2020.01); *G06F 40/42* (2020.01)

(56) References Cited

U.S. PATENT DOCUMENTS

| | | | | |
|---|---|---|---|---|
| 8,892,993 | B2* | 11/2014 | Sikchi | G06F 40/226 715/237 |
| 9,524,275 | B2* | 12/2016 | Sampathkumar | G06F 40/14 |
| 2004/0267760 | A1* | 12/2004 | Brundage | G06F 16/83 |
| 2005/0248790 | A1 | 11/2005 | Ornstein | |
| 2006/0206304 | A1* | 9/2006 | Liu | G06F 40/47 704/2 |
| 2007/0288853 | A1* | 12/2007 | Neil | G06F 9/454 715/760 |
| 2008/0172603 | A1* | 7/2008 | Agarwal | G06F 40/14 715/239 |
| 2011/0314043 | A1* | 12/2011 | Bernstein | G06F 16/84 707/769 |
| 2015/0121199 | A1* | 4/2015 | Wu | G06F 40/131 715/239 |

OTHER PUBLICATIONS

Decision to Grant dated Apr. 16, 2019 for the corresponding Japanese Patent Application No. 2018-157281.
Office Action dated May 21, 2019 for the corresponding Japanese Patent Application No. 2019-019708; with translation.
Office Action dated May 21, 2019 for the corresponding Japanese Patent Application No. 2019-019709; with translation.
Microsoft Word 98 Usage Guide; with translation.

* cited by examiner

FIG. 5

(a) 420
■ MANUAL MANAGEMENT TABLE
PRINCIPAL DATA ITEM
   MAIN INFORMATION: CORPORATION NO, CATEGORY NO, LANGUAGE NO, MANUAL ID, UPDATE ID, NODE INFORMATION (NODE ID), PART ID, CREATOR ID, DATE OF CREATION, UPDATER ID, DATE OF UPDATE, OTHER
   META INFORMATION: VERSION, LANGUAGE TYPE, BOOK CODE, ATTRIBUTE, TITLE, SUBTITLE, VERSION, NUMBER, REMARK
   ATTRIBUTE INFORMATION: LIST OF PART ATTRIBUTE NAME AND PART ATTRIBUTE VALUE, OTHER
   VARIABLE INFORMATION: LIST OF VARIABLE NAME AND VARIABLE VALUE, OTHER
   REFERENCE INFORMATION: LIST OF PART ID AND NODE ID, OTHER
   DERIVED INFORMATION: ORIGINAL MANUAL (CATEGORY NO, MANUAL ID), RELATION WITH ORIGINAL (b) 430
■ PART MANAGEMENT TABLE
PRINCIPAL DATA ITEM
   MAIN INFORMATION: CORPORATION NO, CATEGORY NO, PART ID, PART TYPE, INITIAL PART ATTRIBUTE, CREATOR ID, DATE OF CREATION, UPDATER ID, DATE OF UPDATE, OTHER
   VARIABLE INFORMATION: LIST OF VARIABLE NAME, OTHER
   CONDITION INFORMATION: LIST OF ITEM NAME AND ITEM VALUE (CONDITION)

(c) 440
■ PART MANAGEMENT TABLE
PRINCIPAL DATA ITEM
   MAIN INFORMATION: CORPORATION NO, CATEGORY NO, PART ID, LANGUAGE NO, UPDATE NO, XMLDATA, CREATOR ID, DATE OF CREATION, UPDATER ID, DATE OF UPDATE, OTHER
   UPDATE INFORMATION: UPDATE NO, XML DATA, UPDATER ID, DATE OF UPDATE, OTHER (PRE-UPDATE INFORMATION AT THE TIME OF UPDATE)

FIG. 6

(a) 450
■ IMAGE MANAGEMENT TABLE
PRINCIPAL DATA ITEM
   MAIN INFORMATION: IMAGE NO, CORPORATION NO, LANGUAGE NO, UPDATE NO, REPLACEMENT CHARACTER, CLASSIFICATION, OTHER
   CONDITION INFORMATION: LIST OF ITEM NAME AND ITEM VALUE (CONDITION)
   REFERENCE INFORMATION: DATA FOR EDITING SCREEN, DATA FOR PDF
   DERIVED INFORMATION: LIST OF UPDATE NO REFERRED TO (b) 460
■ MATHEMATICAL FORMULA MANAGEMENT TABLE
PRINCIPAL DATA ITEM
   MAIN INFORMATION: MATHEMATICAL FORMULA NO, CORPORATION NO, LANGUAGE NO, UPDATE NO, REPLACEMENT CHARACTER, CLASSIFICATION, OTHER
   CONDITION INFORMATION: LIST OF ITEM NAME AND ITEM VALUE (CONDITION)
   REFERENCE INFORMATION: DATA FOR EDITING SCREEN, DATA FOR PDF
   DERIVED INFORMATION: LIST OF NEW NO REFERRED TO (c) 470
■ VERSION MANAGEMENT TABLE
PRINCIPAL DATA ITEM
   MAIN INFORMATION: UPDATE ID, UPDATE NO, VERSION, CREATOR ID, DATE OF CREATION, UPDATER ID, DATE OF UPDATE, OTHER

FIG. 9
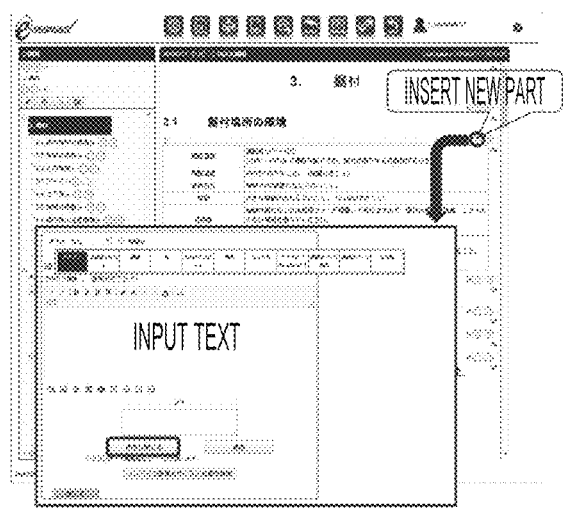
FIG. 10
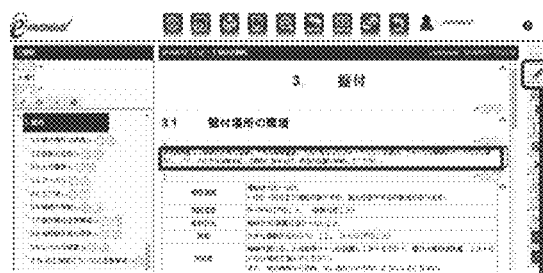

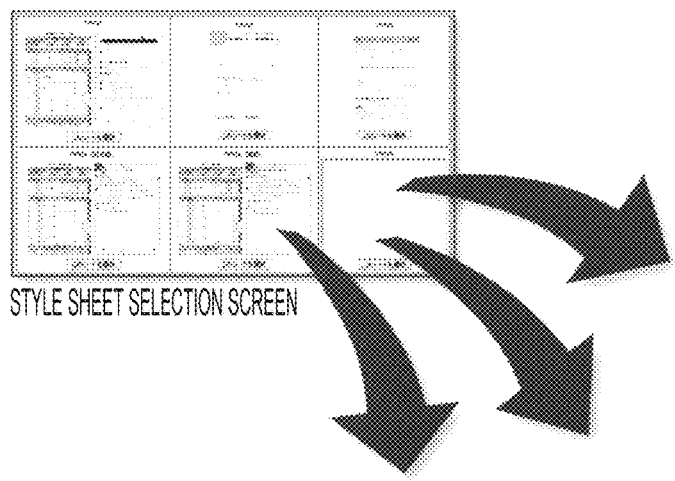
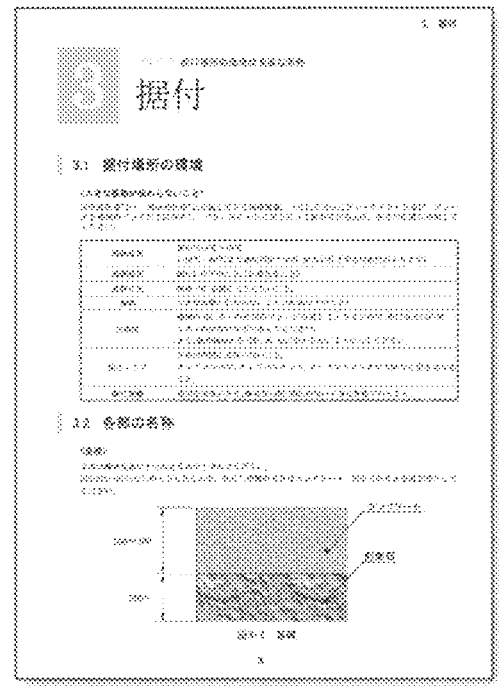
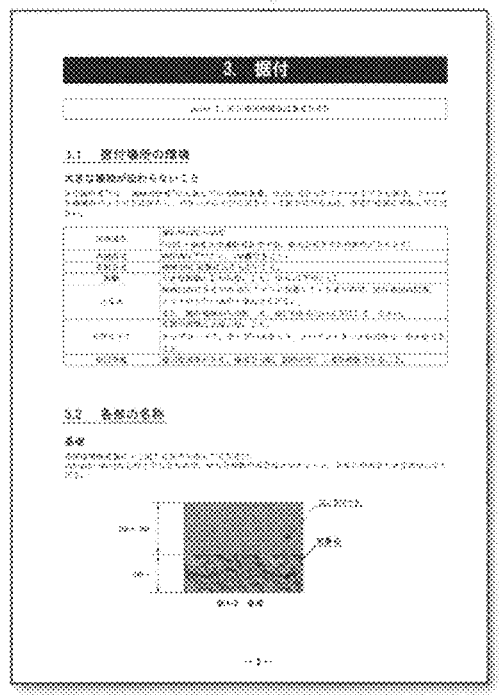
STYLE SHEET SELECTION SCREEN

DOCUMENT CREATION SUPPORT SYSTEM

TECHNICAL FIELD

The present invention relates to a system for supporting creation of a document, and particularly relates to a document creation support system that facilitates translation work.

BACKGROUND ART

Conventionally, for example, a technique described in Patent Literature 1 has been known as a technique of creating a document.

The technique described in Patent Literature 1 is directed to a document creation apparatus that forms a structure of a document with a frame structure of the entire document and sentence element pieces to be embedded into the frame structure, and upon creation of the document, repeatedly selects various kinds of the sentence element pieces that are prepared in advance in accordance with a requirement specification for embedment in the frame structure, thereby creating the document ([0013]-[0031] and FIGS. 1 to 21 of Patent Literature 1).

CITATION LIST

Patent Literature

PATENT LITERATURE 1: Japanese Patent Application Laid-open No. 2001-331481

SUMMARY OF THE INVENTION

Technical Problem

However, the technique described in Patent Literature 1 has a problem in that, when translating a document into other languages, the translation is created by creating a document in the other languages, and embedding sentence element pieces described with the other languages. Thus, translation work is not facilitated because the translation work should be performed while confirming correspondences with the document in the original language.

Therefore, the present invention is made by focusing on such unsolved problem of the conventional technique, and an objective thereof is to provide a document creation support system that facilitates translation work.

Solution to the Problem

[Invention 1] In order to achieve the above-described objective, a document creation support system of Invention 1 comprises: a part storage means for storing a part consisting of one or a plurality of elements; a node information storage means for storing node information that defines an arrangement order or hierarchical relation of the part for each document; a structured data generation means for generating, based on a part of the part storage means and node information of the node information storage means, structured data in which the part is structured; a template storage means for storing a layout template that defines a layout of the part; a document generation means for generating the document based on the structured data generated by the structured data generation means and the layout template of the template storage means; and a multi-language development means for replicating the node information of the document in a first language as the node information of the document in a second language, and correspondingly replicating the part defined in the node information as a part in the second language.

According to such a configuration, the structured data generation means generates the structured data based on the part of the part storage means and the node information of the node information storage means, and the document generation means generates the document based on the generated structured data and the layout template of the template storage means. In addition, the multi-language development means replicates the node information of the document in the first language as the node information of the document in the second language, and correspondingly replicates the part defined in the node information as the part in the second language.

In this regard, the element includes, for example, characters, numbers, codes, marks, terms, other texts, images (including still images and moving images), mathematical formulas, charts, diagrams, graphs, footnotes, headlines, page numbers, titles, body texts, or sounds. The same applies to a document creation support system of Invention 7 described below.

In addition, the part storage means stores the part by any means and at any time. The part may be stored in advance, or the part may be stored by an input from the outside or the like at the time of an operation of the present system without storing the part in advance. Storage of information in the storage means applies hereinafter.

In this regard, the present system may be realized as a single apparatus, terminal or other equipment, or may be realized as a network system to which multiple apparatuses, terminals, or other pieces of equipment are communicably connected. In the case of the latter, respective constituent elements may belong to any of the multiple pieces of equipment and the like as long as they are communicably connected with one another. The same applies to the document creation support system of Invention 7 described below.

[Invention 2] Furthermore, a document creation support system of Invention 2 is the document creation support system of Invention 1, comprising an update management means for, when the part is updated, updating parts in the other languages corresponding to the part or performing processing to promote such update.

According to such a configuration, when the part is updated, the update management means updates the parts in other languages corresponding to the part or performs processing to promote such update.

[Invention 3] Furthermore, a document creation support system of Invention 3 is the document creation support system of Invention 2, wherein the update management means performs notification related to the update of the parts in the other languages.

According to such a configuration, when the part is updated, the update management means performs notification related to the update of the parts in the other languages corresponding to the part.

[Invention 4] Furthermore, a document creation support system of Invention 4 is the document creation support system of any one of Invention 1 to Invention 3, comprising a variable information storage means for storing variable information that defines variable identification information and variable content information for each document, wherein the element includes the variable identification information, and the document generation means converts the variable identification information included in the element into the variable content information corresponding to the variable identification information, based on the variable information of the document to be generated among the variable information of the variable information storage means.

According to such a configuration, the document generation means converts the variable identification information included in the element into the variable content information corresponding to the variable identification information, based on the variable information of the document to be generated among the variable information of the variable information storage means.

In this regard, the variable identification information is information used for identification, and it may include, for example, names, numbers, IDs, codes, or link information such as URL. In addition, the variable identification information may include, for example, characters, numbers, diagrams, codes, marks, images, or other kinds of information.

In addition, the variable content information is information that replaces the variable identification information, and any kind of information may be employed. For example, it may include names, numbers, IDs, codes, or link information such as URL.

[Invention 5] Furthermore, a document creation support system of Invention 5 is the document creation support system of any one of Invention 1 to Invention 4, comprising an element storage means for storing the element, wherein the part includes replacement information for identifying the element, and the document generation means obtains the element from the element storage means based on the replacement information included in the part, and generates the document based on the obtained element.

According to such a configuration, the document generation means obtains the element from the element storage means based on the replacement information included in the part, and generates the document based on the obtained element.

In this regard, the replacement information is information for identifying the element, and it may include, for example, names, numbers, IDs, codes, or link information such as URL. In addition, the replacement information may include, for example, characters, numbers, diagrams, codes, marks, images, or other kinds of information.

[Invention 6] Furthermore, a document creation support system of Invention 6 is the document creation support system of any one of Invention 1 to Invention 5, comprising an update history generation means for generating update history of each language concerning a part corresponding to multiple languages.

According to such a configuration, the update history generation means generates the update history of each language concerning the part corresponding to the multiple languages.

[Invention 7] Furthermore, a document creation support system of Invention 7 comprises: a part storage means for correspondingly storing a first part consisting of one or a plurality of elements and a second part consisting of one or a plurality of elements; a node information storage means for storing first node information that defines an arrangement order or hierarchical relation of the first part concerning a document in a first language, and second node information that defines an arrangement order or hierarchical relation of the second part correspondingly to the arrangement order or hierarchical relation defined in the first node information concerning the document in a second language; a structured data generation means for generating, based on a part of the part storage means and node information of the node information storage means, structured data in which the part is structured; a template storage means for storing a layout template that defines a layout of the part; and a document generation means for generating the document based on the structured data generated by the structured data generation means and the layout template of the template storage means.

According to such a configuration, the part used for the document in the second language corresponds to the part used for the document in the first language, and thus translation into the second language can be performed for each part used for the document in the first language. Furthermore, the structured data generation means generates the structured data based on the part of the part storage means and the node information of the node information storage means, and the document generation means generates the document based on the generated structured data and the layout template of the template storage means.

Advantages of the Invention

As has been described above, according to the document creation support system of Invention 1 or Invention 7, translation into the second language can be performed for each part used for the document in the first language, and thus translation work is facilitated as compared to conventional techniques.

Furthermore, according to the document creation support system of Invention 2, when the part is updated, update of parts in the other languages corresponding to the part, or processing to promote such update is performed. Thus, update of translation can be performed in part units, and translation work is further facilitated.

Furthermore, according to the document creation support system of Invention 3, when the part is updated, notification related to the update of the parts in the other languages corresponding to the part is performed. Thus, a part that should be updated can be recognized.

Furthermore, according to the document creation support system of Invention 4, the variable content information corresponding to the document can be applied to a context that is in common among a plurality of documents.

Furthermore, according to the document creation support system of Invention 5, one element can be applied to multiple places, and a change in the element is also facilitated.

Furthermore, according to the document creation support system of Invention 6, the update history of each language can be recognized concerning a part corresponding to multiple languages.

BRIEF DESCRIPTION OF THE DRAWINGS

FIG. 5 is a figure illustrating data structures of a manual management table 420, and part management tables 430, 440.

FIG. 6 is a figure illustrating data structures of an image management table 450, a mathematical formula management table 460, and a version management table 470.

FIG. 9 is a screen illustrating an operation of adding a part.

FIG. 10 is a screen illustrating an operation of changing a content of a part.

FIG. 19 is a figure for explaining realization of various layouts with a layout template.

DESCRIPTION OF EMBODIMENTS

Hereinafter, an embodiment of the present invention will be described. FIG. 1 to FIG. 19 are figures illustrating the present embodiment.

Firstly, a configuration of the present embodiment will be explained.

Figure 1:
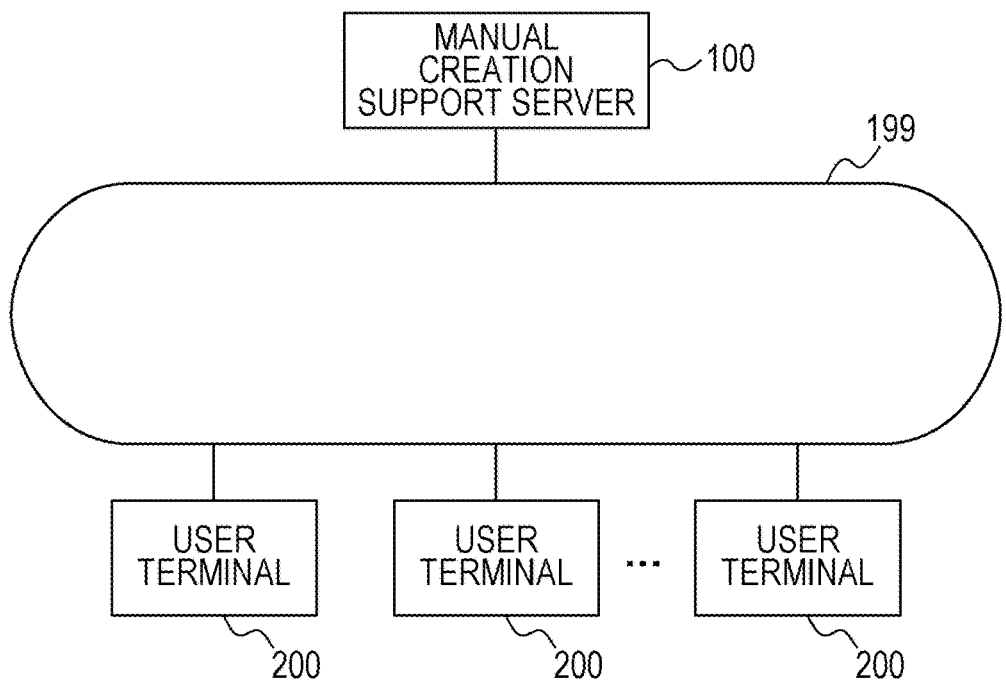
FIG. 1 is a block diagram illustrating a configuration of a network system of the present embodiment.

FIG. 1 is a block diagram illustrating a configuration of a network system of the present embodiment.

As illustrated in FIG. 1, a manual creation support server 100 for supporting creation of a manual, and a user terminal 200 that is installed in each corporation, are connected to Internet 199.

Next, a configuration of the manual creation support server 100 will be explained.

Figure 2:
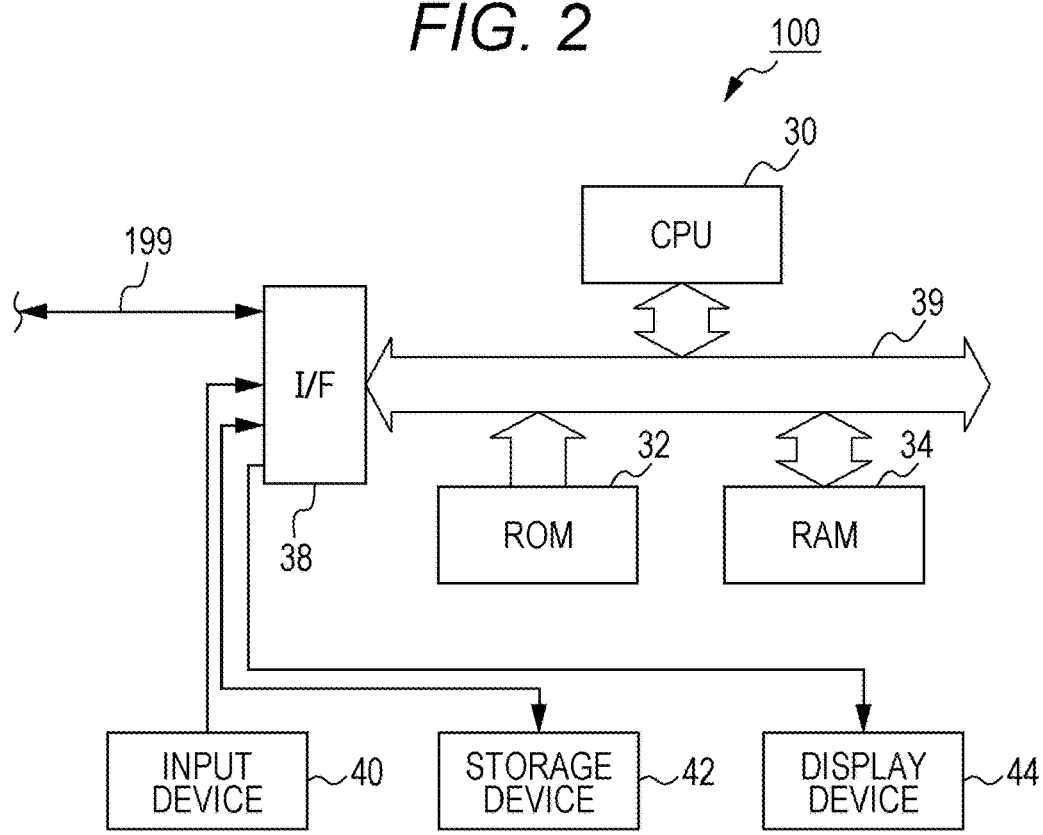
FIG. 2 is a figure illustrating a hardware configuration of a manual creation support server 100.

FIG. 2 is a figure illustrating a hardware configuration of the manual creation support server 100.

As illustrated in FIG. 2, the manual creation support server 100 is composed of a central processing unit (CPU) 30 that controls arithmetic calculation and an entire system based on a control program, read only memory (ROM) 32 that stores the control program or the like of the CPU 30 in a prescribed region in advance, random access memory (RAM) 34 that stores data read out from the ROM 32 or the like and the result of arithmetic calculation that is necessary in the process of arithmetic calculation of the CPU 30, and an interface (I/F) 38 that mediates input and output of data to an external device, and these are mutually connected in a manner capable of transferring data by a bus 39 that is a signal line for transferring data.

The I/F 38 is connected to an input device 40 consisting of a keyboard, a mouse, and the like that are capable of inputting data as human interfaces, a storage device 42 that stores data, table, and the like as files, a display device 44 that displays a screen based on an image signal, and a signal line for connection to the Internet 199, as external devices.

Next, a data structure of the storage device 42 will be explained.

Figure 3:
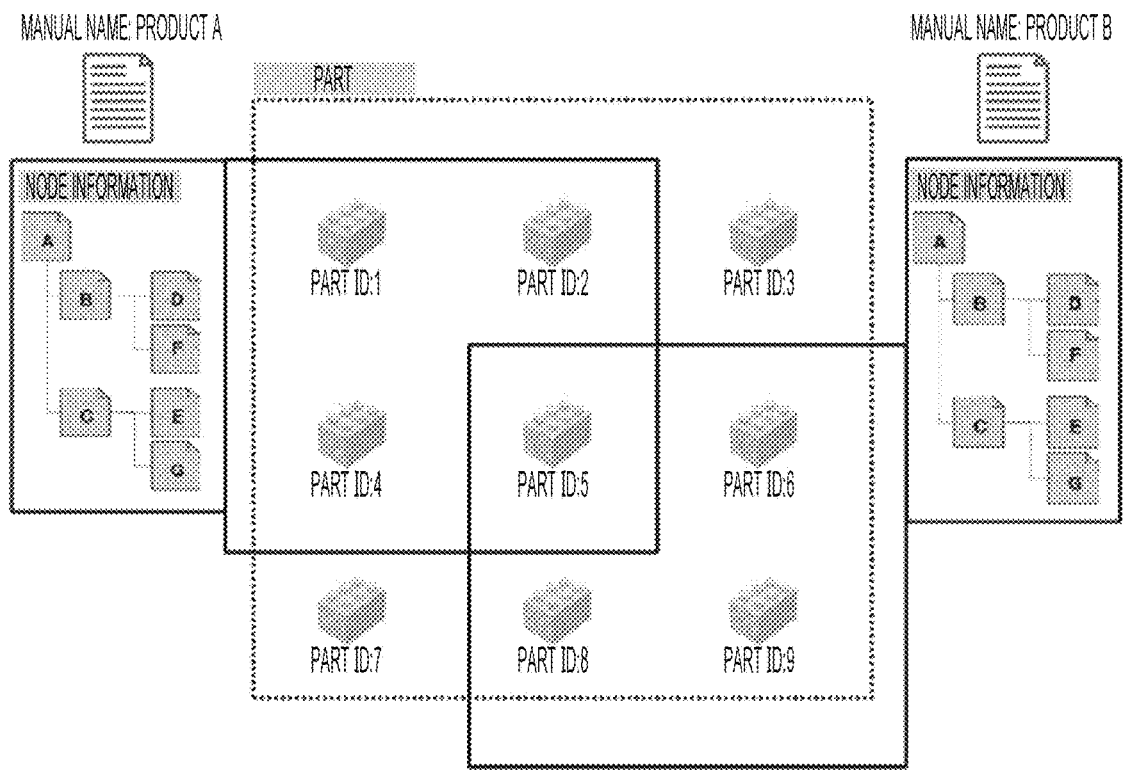
FIG. 3 is a figure illustrating relations among a manual, node information, and parts.

FIG. 3 is a figure illustrating relations among a manual, node information, and parts.

In the manual creation support server 100, a manual can create terms, sentences, images, mathematical formulas, and other elements in part units. Thus, as illustrated in FIG. 3, the manual includes one or a plurality of parts, and node information that defines an arrangement order or hierarchical relation of the parts. In the example in FIG. 3, the manual of a "Product A" consists of parts 1, 2, 4, and 5, and the arrangement order or hierarchical relation of these parts is defined in the node information. In addition, the manual of a "Product B" consists of parts 5, 6, 8, and 9, and the arrangement order or hierarchical relation of these parts is defined in the node information. In this regard, the part 5 is shared between the manual of the "Product A" and the manual of the "Product B".

Manuals are managed for each corporation and each category. A plurality of images are registered in an image library. A plurality of mathematical formulas are registered in a mathematical formula library. A plurality of parts consisting of one or a plurality of elements (terms, sentences, images, mathematical formulas, and other elements) are registered in a part library. An attribute can be set for a part, and a plurality of attributes are registered in an attribute library.

Figure 4:
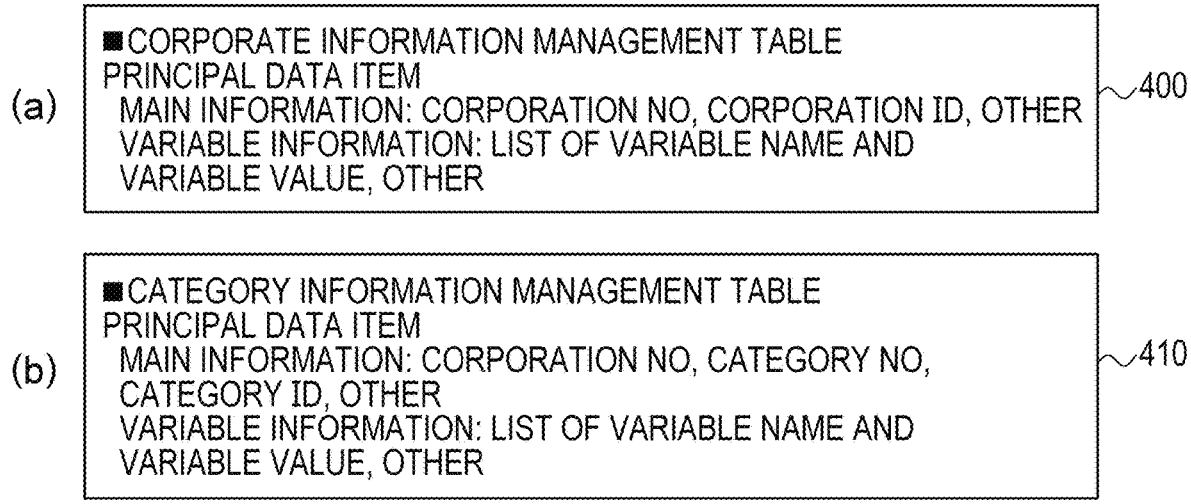
FIG. 4 is a figure illustrating data structures of a corporate information management table 400 and a category information management table 410.

FIG. 4 is a figure illustrating data structures of a corporate information management table 400 and a category information management table 410.

As illustrated in FIG. 4, the storage device 42 stores the corporate information management table 400 for managing corporate information, and the category information management table 410 for managing category information.

As illustrated in FIG. 4(*a*), in the corporate information management table 400, one record is registered for each corporation. Main information consisting of corporation NOs, corporation IDs, and other kinds of information; and variable information consisting of a list in which variable names and variable values are correspondingly registered, and other kinds of information, are registered in each record. NOs are internal numbers for system implementation. On the other hand, IDs are included in data as external specifications. Although NOs are always numerical values, IDs include characters other than numbers. In addition, although NOs are always unique within the system, a same ID exists among different language NOs.

As illustrated in FIG. 4(*b*), in the category information management table 410, one record is registered for each corporation and each category. Main information consisting of corporation NOs, category NOs, category IDs, and other kinds of information; and variable information consisting of a list in which variable names and variable values are correspondingly registered, and other kinds of information, are registered in each record.

FIG. 5 is a figure illustrating data structures of a manual management table 420 and part management tables 430, 440.

As illustrated in FIG. 5, the storage device 42 further stores the manual management table 420 for managing a manual, and the part management tables 430, 440 for managing parts in the part library.

As illustrated in FIG. 5(*a*), in the manual management table 420, one record is registered for each manual. Main information consisting of corporation NOs, category NOs, language NOs, manual IDs, update IDs, node information (node IDs), part IDs, creator IDs, dates of creation, updater IDs, dates of update, and other kinds of information; meta information consisting of versions, language types, book codes, attributes, titles, subtitles, versions, numbers, and remarks; attribute information consisting of a list in which part attribute names and part attribute values are correspondingly registered, and other kinds of information; variable information consisting of a list in which variable names and variable values are correspondingly registered, and other kinds of information; reference information consisting of a list of part IDs and node IDs, and other kinds of information; and derived information consisting of relations with an original manual (category NOs, manual IDs) and the original, are registered in each record.

The node information will be explained. An element constituting a manual is referred to as a node, and this has an ID that is uniquely identified within the manual. A portion in which data (e.g., texts) of the node is stored is referred to as a part, and this has an ID that is uniquely identified within a corporation. To cause parts used in a plurality of manuals to be the same (the same part ID) is referred to as aggregation, and the aggregated parts are referred to from a plurality of nodes. In contrast, to cause a part used in one manual to be unique (different part ID) is referred to as separation, and the separated part is referred to from one node.

A copy (replication) of a manual will be explained. The copy of the manual includes three types of copies that are separation copy, aggregation copy, and development copy. The separation copy is to perform copy by utilizing a unique part different from a manual that is the copy source. The aggregation copy (also referred to as the "reference copy") is to perform copy by utilizing the same part as a manual that is the copy source. The development copy is to perform aggregation copy that involves change in the language type and provision of update IDs (versions).

The variable information will be explained. Since a manual has a context, reuse of parts is limited in simple texts. Dependence on the context is reduced by describing context-dependent portions with variable names, and converting the variable names into variable values at the time of output of the manual. The variable values corresponding to the variable names are set for each context. With regard to a part used in a plurality of manuals, variable values corresponding to the variable names that are set in the respective manuals are listed as selection candidates. The variable values corresponding to the variable names are converted in accordance with a combination of situations and a content of items, which will be described later.

The situation (context) will be explained. For reuse of parts, data to be output is set in association with the next situation. Part-specific, node-specific, manual-specific, category-specific, corporation-specific, media-specific, language-specific, update (version)-specific are set.

The item (reference and condition) will be explained. Part information, meta information of the manual, category information, and corporate information can be referred to depending on the situation in which the part is used. The condition can be set by combining the kinds of information referred to. The part information includes section numbers, section titles, figure numbers, figure names, chart numbers, titles, numbers, title numbers, title contents, item numbers, item names, and other kinds of information. The meta information of the manual includes versions, language types, book codes, attributes, titles, subtitles, versions, numbers, remarks, and part attributes.

The partial translation and the multi-language development will be explained. Conventionally, a manual that is not partialized requires translation of the entire manual for a term or other reasons. In contrast, in a manual that is partialized as in the case of the present embodiment, translation can be limited only to an updated portion by detecting update in part units. By providing parts with data of each language type, translation can be limited to an updated portion also in a manual that needs to correspond to multiple languages. With regard to a manual that is made of parts that have been translated, translation completes by only performing development copy of the manual. If there is a new portion that does not have translation in the corresponding language type, the original of the new portion is output by tracking the manual of the development copy source, and the style as a manual is maintained. The new portion promotes translation in other language types through the manual for which development copy is performed.

As illustrated in FIG. 5(b), in the part management table 430, one record is registered for each part. Main information consisting of corporation NOs, category NOs, part IDs, part types, initial part attributes, creator IDs, dates of creation, updater IDs, dates of update, and other kinds of information; variable information consisting of a variable name list and other kinds of information; and condition information consisting of a list in which item names and item values (conditions) are correspondingly registered, are registered in each record.

As illustrated in FIG. 5(c), in the part management table 440, one record is registered for each updated part. Main information consisting of corporation NOs, category NOs, part IDs, language NOs, update NOs, XML data, creator IDs, dates of creation, updater IDs, dates of update, and other kinds of information; and update information consisting of update NOs, XML data, updater IDs, dates of update, and other kinds of information (pre-update information at the time of update) are registered in each record. With regard to a manual described in different languages, parts used in the manual in a first language are managed correspondingly to parts used in the manual in a second language. The same part ID is set for parts of the same node, and the parts are distinguished with language NOs. In the example in FIG. 3, for example, when the manual of Product A has a manual Mjp in Japanese and a manual Men in English, the manual Mjp uses parts having part IDs "1", "2", "4", and "5", and the manual Men includes node information having the same structure as the manual Mjp, and uses parts corresponding to the respective parts of the manual Mjp. With regard to the respective parts of the manual Mjp and the respective parts of the manual Men, the same part ID is correspondingly set for the parts of the same node. Accordingly, the parts having part IDs "1", "2", "4", and "5" are used for the manual Men. However, a language No corresponding to Japanese is set for the parts used in the manual Mjp, and a language No corresponding to English is set for the parts used in the manual Men, for distinction.

FIG. 6 is a figure illustrating data structures of an image management table 450, a mathematical formula management table 460, and a version management table 470.

As illustrated in FIG. 6, the storage device 42 further stores the image management table 450 for managing the images in the image library, the mathematical formula management table 460 for managing the mathematical formulas in the mathematical formula library, and the version management table 470 for managing the versions of the manual.

As illustrated in FIG. 6(a), in the image management table 450, one record is registered for each image. Main information consisting of image NOs, corporation NOs, language NOs, update NOs, replacement characters, classification categories, and other kinds of information; condition information consisting of a list in which item names and item values (conditions) are correspondingly registered; reference information consisting of data for editing screens and data for PDF; and derived information consisting of a list of update NOs that are referred to, are registered in each record.

The replacement characters will be explained. Image data such as figures and mathematical formulas need to be replaced, and the same image data is utilized in multiple places. By describing an image data portion with a replacement character, and converting the replacement character into image data at the time of output of the manual, one-time replacement of the image data is enabled, and dependence on the image data of the parts is reduced. Unlike the variables, the replacement characters and the image data are managed as a library in corporation units. Image data of each language type can be registered for the same replacement character string, and conversion is made by using a combination of situations and items, which will be described later, as the conditions.

As illustrated in FIG. 6(b), in the mathematical formula management table 460, one record is registered for each mathematical formula. Main information consisting of mathematical formula NOs, corporation NOs, language NOs, update NOs, replacement characters, classification categories, and other kinds of information; condition information consisting of a list in which item names and item values (conditions) are correspondingly registered; reference information consisting of data for editing screens and data for PDF; and derived information consisting of a list of update NOs that are referred to, are registered in each record.

As illustrated in FIG. 6(c), in the version management table 470, one record is registered for each version. Main information consisting of update IDs, update NOs, versions, creator IDs, dates of creation, updater IDs, dates of update, and other kinds of information is registered in each record.

The storage device 42 further stores a layout template that defines a layout of parts. Upon creation of a manual, a layout template to be applied for the layout is specified.

Next, operations in the present embodiment will be explained.

Firstly, operations when creating a manual will be explained.

Figure 7:
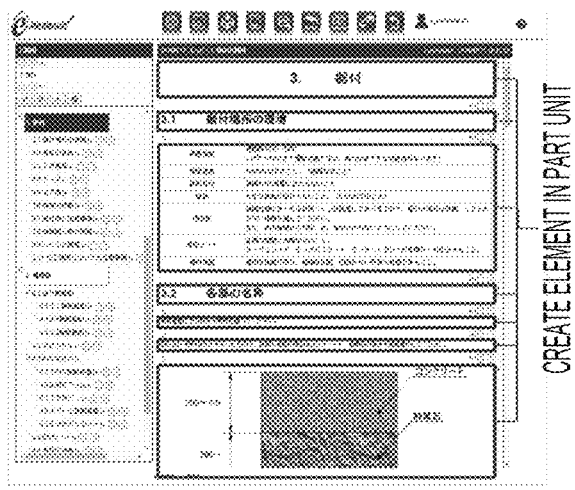
FIG. 7 is a figure for explaining ways for creating a manual.

FIG. 7 is a figure for explaining ways of creating a manual.

As illustrated in FIG. 7, a manual is created by arranging parts in a layout region. The parts are arranged in the vertical direction or the horizontal direction of the layout region. First of all, one part is added to the layout region. The next part can be added immediately before or immediately after the existing part. The same applies to subsequent parts, and they can be added to optional positions with respect to the existing part. Terms, sentences, images, mathematical formulas, and other elements can be described for a part, and hierarchical relations with respect to other parts can also be set. In addition, there is a part that is divided into two. This is a part in which the region is divided into two portions that are the left side and the right side, and texts, images, charts, items, and the like are arranged in each portion. Furthermore, there is a part made of two columns. This is a part in which the region is divided into two portions that are the left side and the right side, and texts are continuously arranged from the left side to the right side. The contents of parts can be changed, and deletion can also be made.

Figure 8:
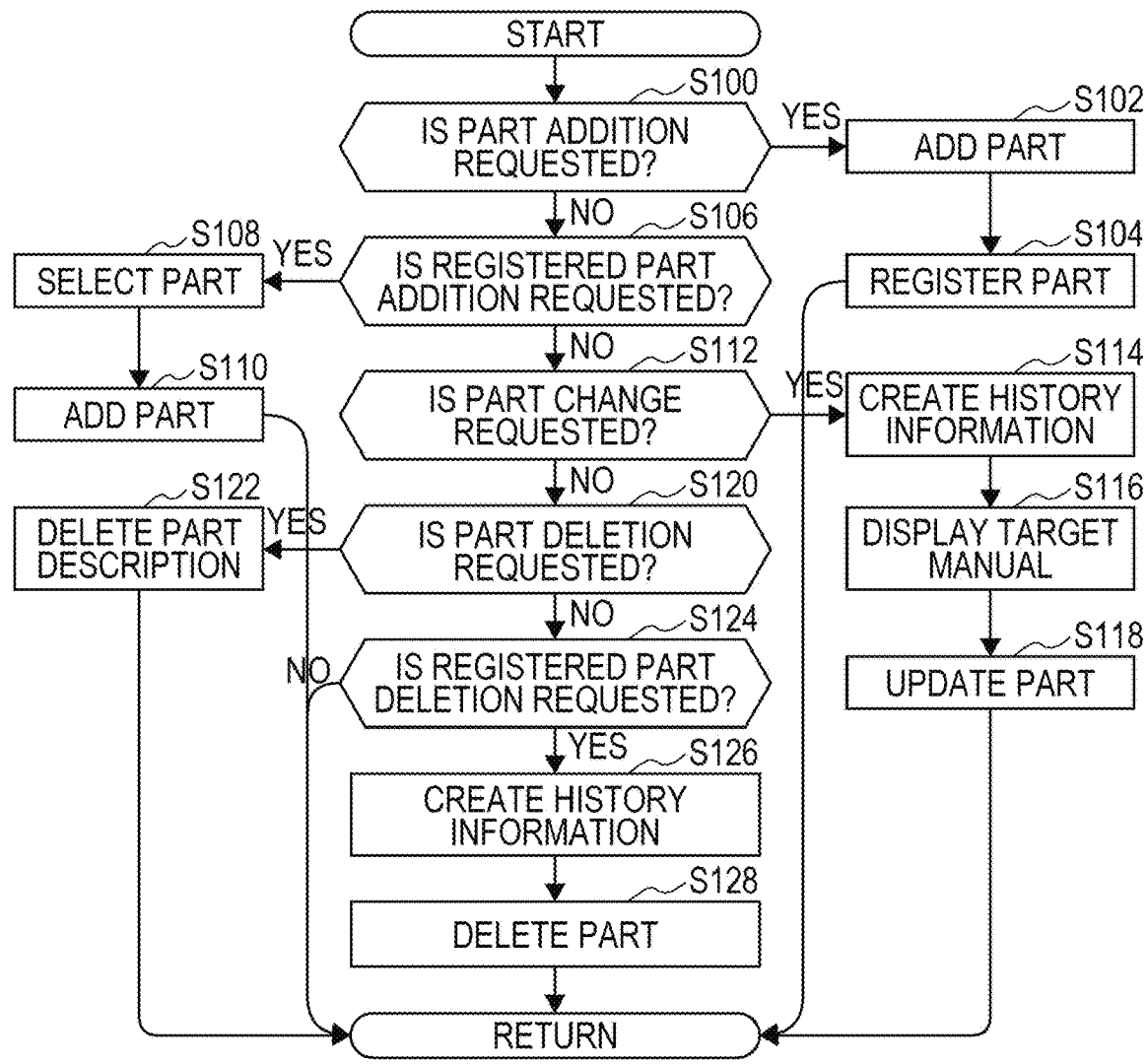
FIG. 8 is a flow chart illustrating manual creation processing.

FIG. 8 is a flow chart illustrating manual creation processing.

The CPU 30 consists of a micro-processing unit (MPU) and the like. The CPU 30 activates a prescribed program stored in a prescribed region of the ROM 32, and executes the manual creation processing illustrated in the flow chart of FIG. 8 according to that program.

When the manual creation processing is executed in the CPU 30, firstly, a shift is made to Step S100 as illustrated in FIG. 8.

In Step S100, whether a part addition request to add a new part is made from the user terminal 200 is determined, and when it is determined that the part addition request is made (YES), a shift is made to Step S102.

FIG. 9 is a screen illustrating an operation of adding a part.

With regard to the user terminal 200, in the screen illustrated in FIG. 9, the right half of the layout region is designated as a region for arranging parts, and the left half is designated as a region for arranging a menu and the like. When a "part insertion" button at a place for which a new part is intended to be inserted is clicked, the part addition request is transmitted to the manual creation support server 100.

In Step S102, the new part is added to the layout region, and a description related to the new part is incorporated in the node information of a manual that is currently created. After shifting to Step S104, once a new element is described in the added part, the added part is registered in the part management table 440, and the series of processing are completed to return to the original processing.

On the other hand, when it is determined that the part addition request is not made in Step S100 (NO), a shift is made to Step S106.

In Step S106, whether a registered part addition request to add a new part from the parts registered in the part management table 440 is made from the user terminal 200 is determined, and when it is determined that the registered part addition request is made (YES), a shift is made to Step S108.

In Step S108, a list of the parts registered in the part management table 440 is presented to the user terminal 200, and once a part is selected from the list of the parts, a shift is made to Step S110 in which the selected part is added to the layout region, and a description related to the new part is incorporated in the node information of the currently-created manual, thereby completing the series of processing to return to the original processing.

On the other hand, when it is determined that the registered part addition request is not made in Step S106 (NO), a shift is made to Step S112.

In Step S112, whether a part change request to change a content of the part arranged in the layout region is made from the user terminal 200 is determined, and when it is determined that the part change request is made (YES), a shift is made to Step S114.

FIG. 10 is a screen illustrating an operation of changing a content of a part.

As illustrated in FIG. 10, in the user terminal 200, when an "edit" button that is on the right side of the part for which the content is intended to be changed is clicked, the part change request is transmitted to the manual creation support server 100.

In Step S114, history information indicating the content of the part before change is created, and the created history information is stored in the storage device 42. In this manner, the part can be restored based on the history information even after the change of the content. Furthermore, a shift is made to Step S116 in which the node information of a part to be updated is retrieved from the manual management table 420, and based on the retrieved node information, a list of target manuals using the part to be updated is presented to the user terminal 200, thereby causing the user to confirm propriety of update. As a result, when the update is confirmed, a shift is made to Step S118 in which the part to be updated among the parts registered in the part management table 440 is updated, and the series of processing are completed to return to the original processing. Once the part is updated, the updated content with respect to the part to be updated is commonly reflected to a plurality of manuals using the part to be updated.

On the other hand, when it is determined that the part change request is not made in Step S112 (NO), a shift is made to Step S120.

In Step S120, whether a part deletion request to delete the part arranged in the layout region is made from the user terminal 200 is determined, and when it is determined that the part deletion request is made (YES), a shift is made to Step S122.

Figure 11:
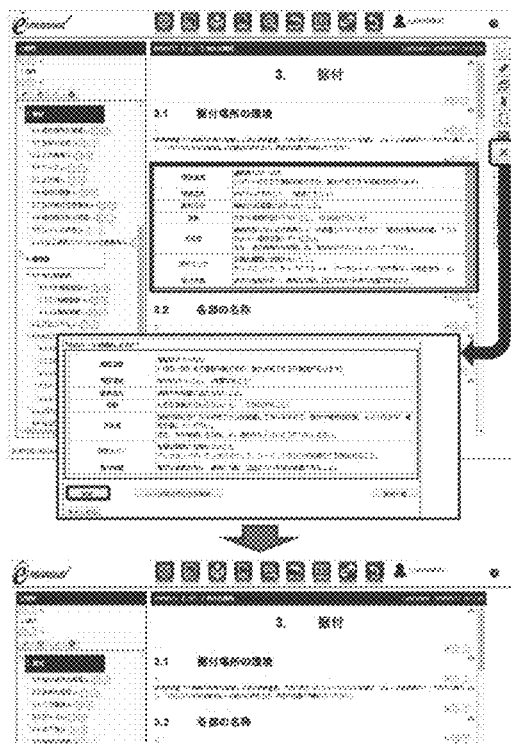
FIG. 11 is a screen illustrating an operation of deleting a part.

FIG. 11 is a screen illustrating an operation of deleting a part.

As illustrated in FIG. 11, in the user terminal 200, when a "delete" button that is on the right side of a part that is intended to be deleted is clicked, the part deletion request is transmitted to the manual creation support server 100.

In Step S122, the part to be deleted is not deleted, but a description related to the part to be deleted in the node information of the currently-created manual is deleted, thereby completing the series of processing to return to the original processing.

On the other hand, when it is determined that the part deletion request is not made in Step S120 (NO), a shift is made to Step S124.

In Step S124, whether a registered part deletion request to delete a part registered in the part management table 440 is made from the user terminal 200 is determined, and when it is determined that the registered part deletion request is made (YES), a shift is made to Step S126.

In Step S126, history information indicating the content of the part before deletion is created, and the created history information is stored in the storage device 42. In this manner, the part can be restored based on the history information even after the deletion. Then, a shift is made to Step S128 in which the part to be deleted among the parts registered in the part management table 440 is deleted, and the series of processing are completed to return to the original processing.

On the other hand, when it is determined that the registered part deletion request is not made in Step S124 (NO), the series of processing are completed to return to the original processing.

Next, an operation in the case of performing multi-language development of a manual will be explained.

Figure 12:
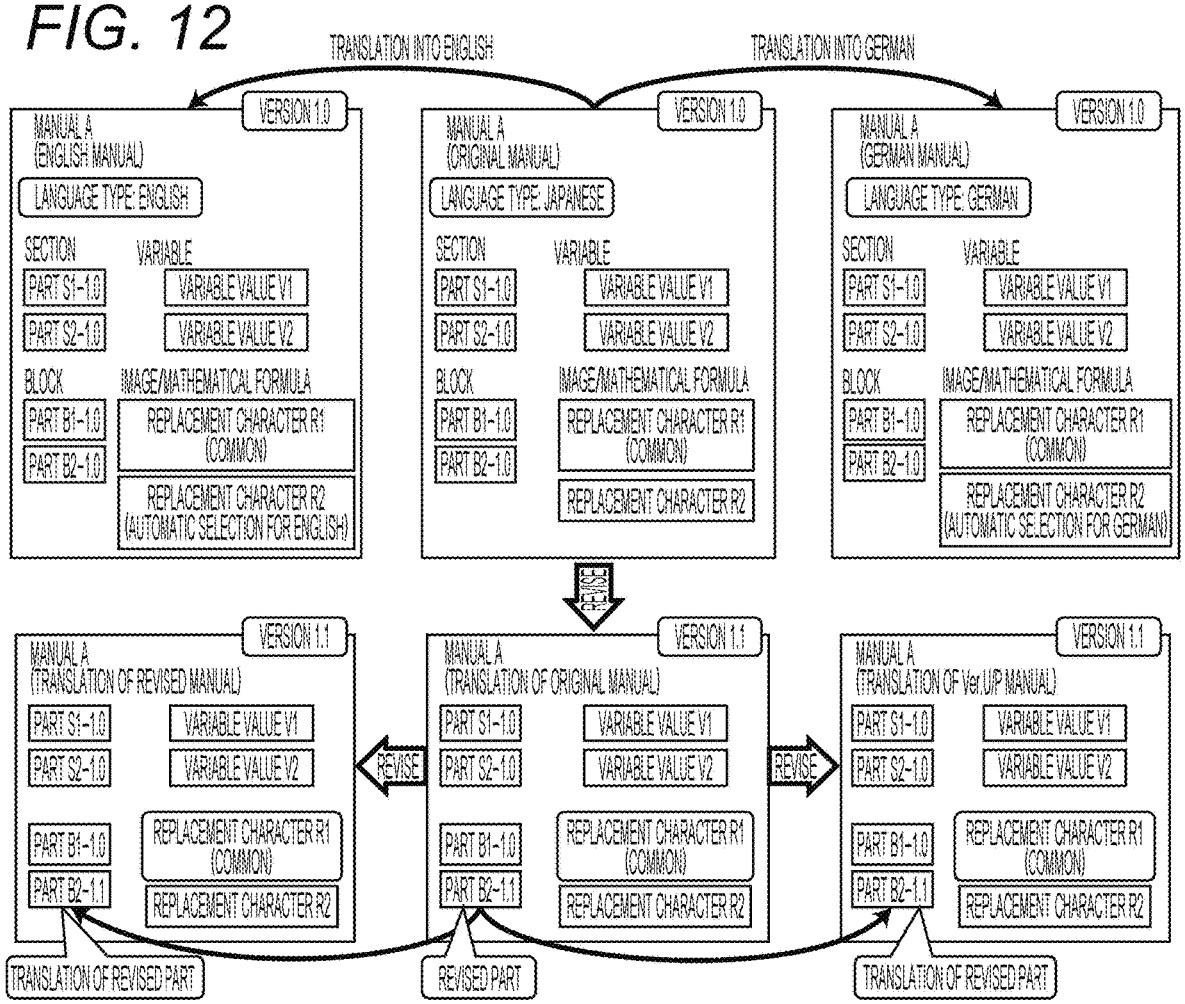
FIG. 12 is a figure illustrating a data structure when developing manuals in English and German from a manual in Japanese.

FIG. 12 is a figure illustrating a data structure when developing manuals in English and German from a manual in Japanese.

Figure 13:
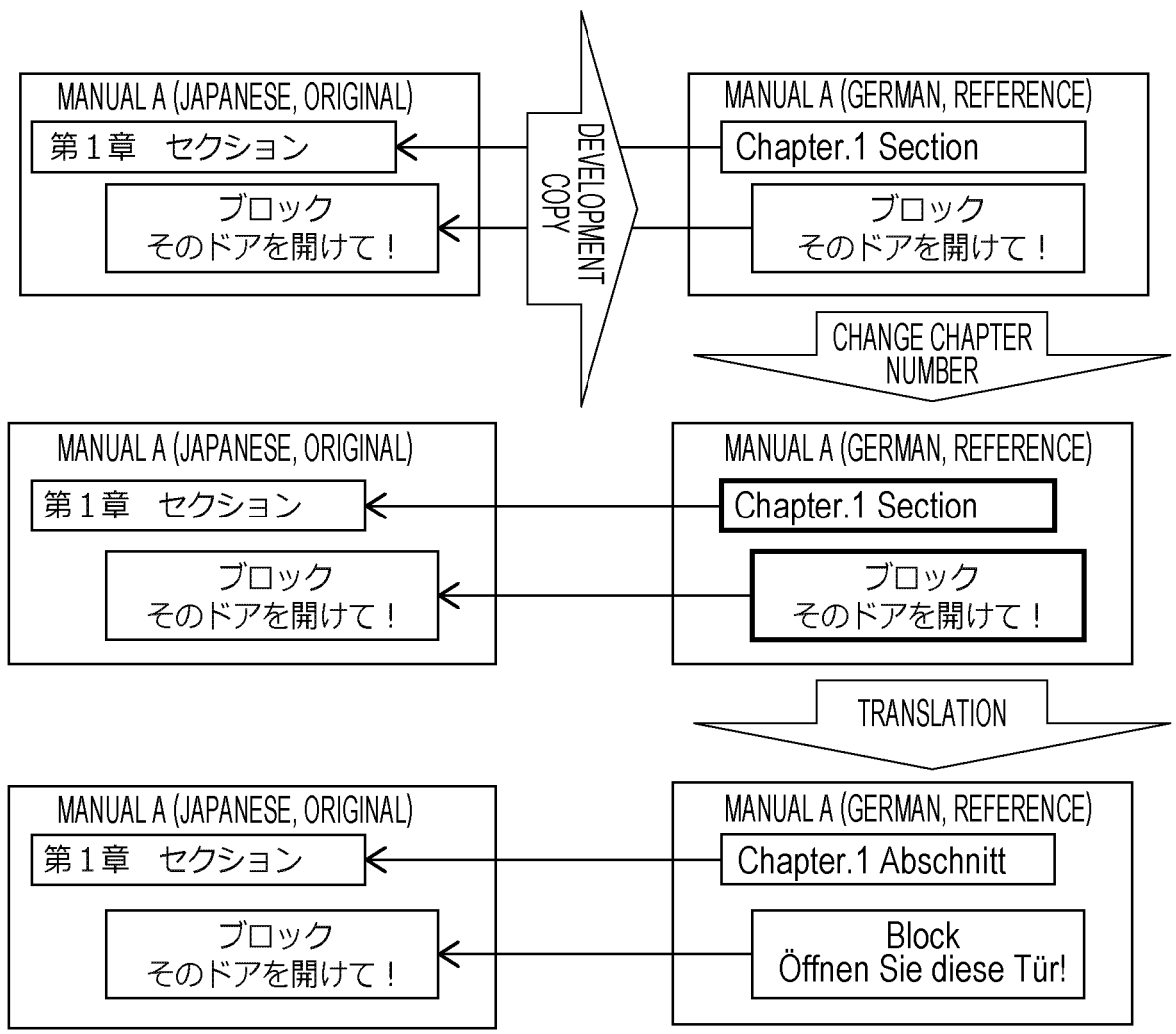
FIG. 13 is a figure illustrating procedures when developing a manual in German from a manual in Japanese.

FIG. 13 is a figure illustrating procedures when developing a manual in German from a manual in Japanese.

As illustrated in FIG. 12 and FIG. 13, when creating a manual in German from a manual in Japanese, firstly, the manual in German is created from the manual in Japanese by development copy. Then, a matter (e.g., chapter number) unique to the manual in German is set. Then, creation is finished by performing translation of texts and the like, registration of images for the German manual, and the like. Images registered for the German manual of the same replacement characters are used. Thus, the parts used in the manuals in Japanese and German are regarded as corresponding to multiple languages.

Creation of a manual in English from a manual in Japanese is performed in the same way.

Next, an operation in the case of partially translating a manual will be explained.

Figure 14:
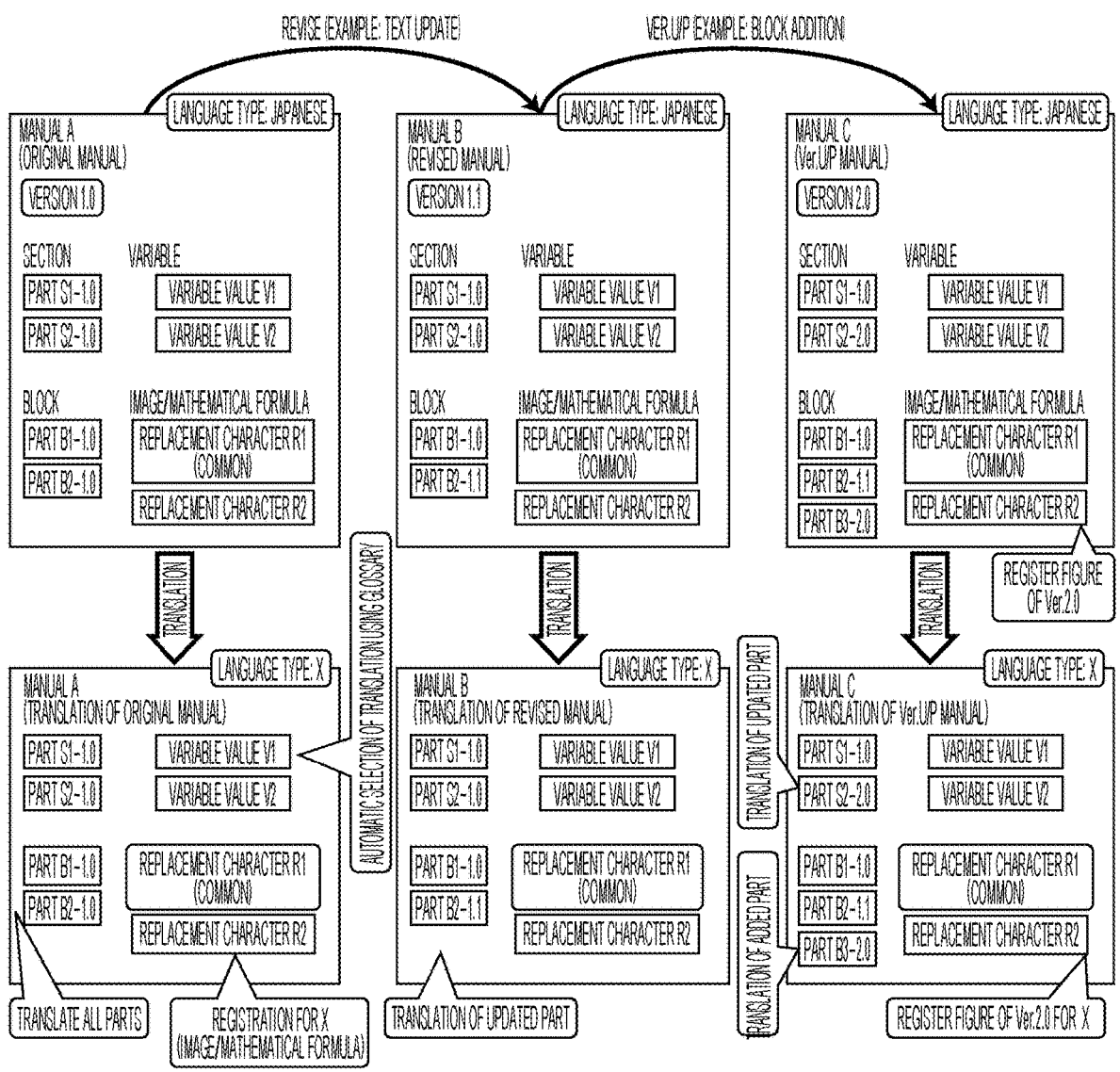
FIG. 14 is a figure illustrating a data structure when performing partial translation.

FIG. 14 is a figure illustrating a data structure when performing partial translation.

Figure 15:
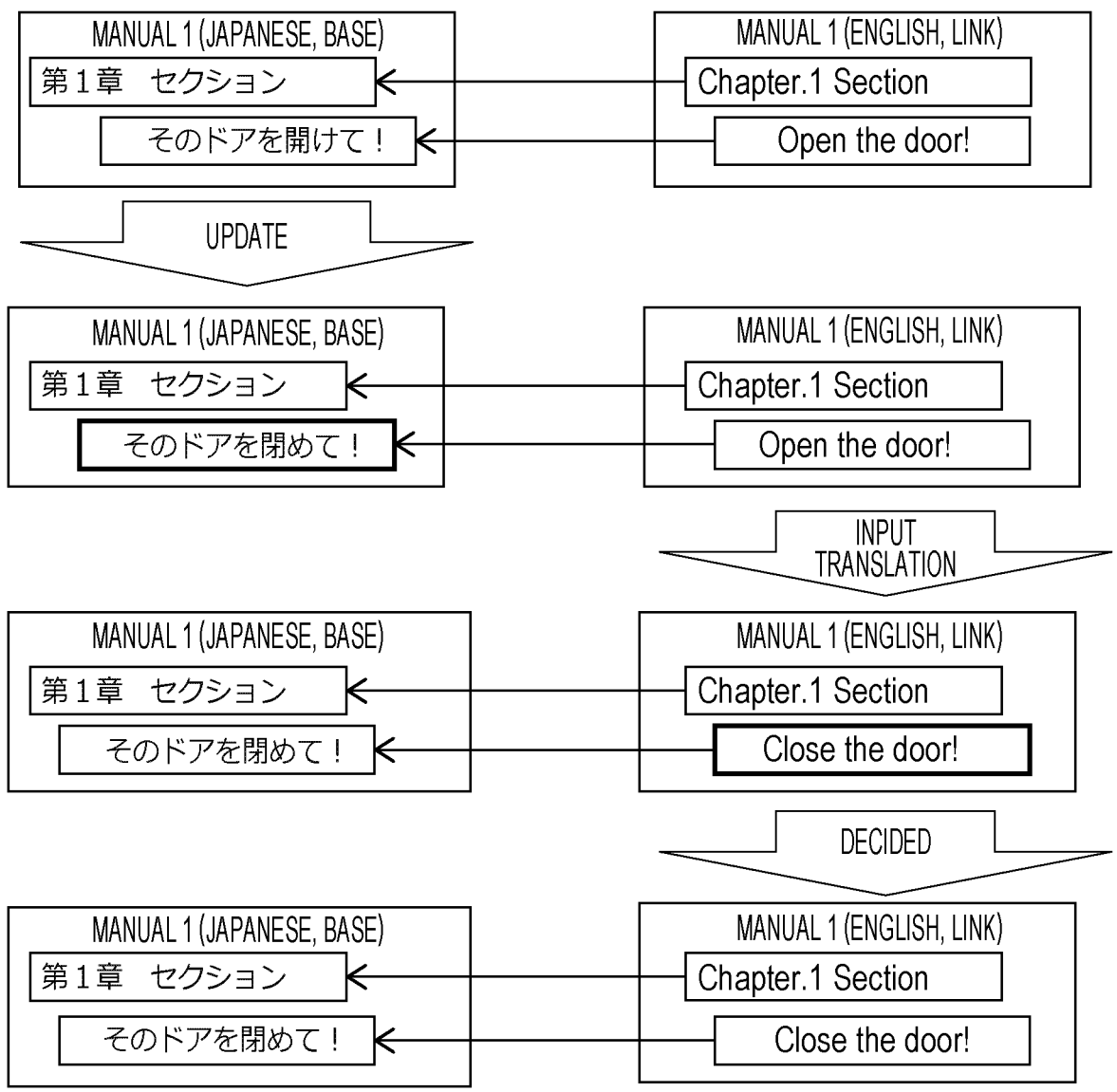
FIG. 15 is a figure illustrating procedures when performing partial translation.

FIG. 15 is a figure illustrating procedures when performing partial translation.

As illustrated in FIG. 14 and FIG. 15, when performing partial translation after the manual in English is created from the manual in Japanese, firstly, a part of the manual in Japanese that becomes the basis is updated. For example, the sentence of a certain part is changed from "Open the door!" to "Close the door!". Then, a part in a different language that corresponds to the updated part is changed to a display indicating that update is required. Then, this part in the manual in English is updated. For example, the sentence in the corresponding part is changed from "Open the door!" to "Close the door!". Furthermore, once the update content is decided, the display is changed to an ordinary display.

Figure 16:
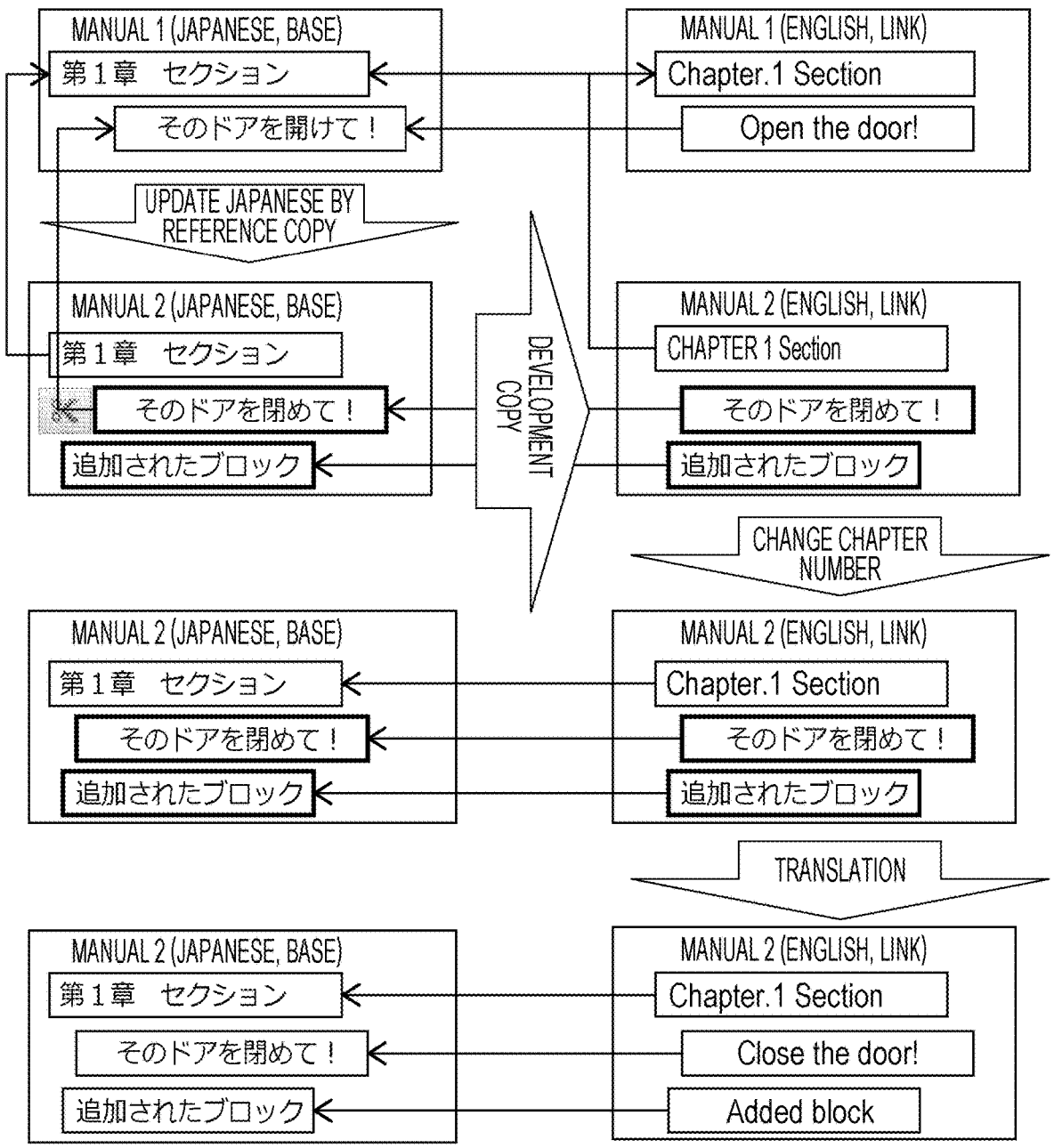
FIG. 16 is a figure illustrating procedures when reusing existing translation.

FIG. 16 is a figure illustrating procedures in the case of reusing existing translation.

As illustrated in FIG. 16, when creating a manual other than Japanese by referring to the manual in Japanese after the manual in English is created from the manual in Japanese, firstly, a manual 2 in Japanese is created from a manual 1 in Japanese that is the basis by reference copy. A manual 1 in English is created for the manual 1 in Japanese. Then, in order not to change the manual 1 in Japanese, which is the basis, a part that needs to be updated in the manual 2 in Japanese is separated. Since the separation is made, the part does not have a part in English. In addition, a block is newly added. Then, a manual 2 in English is created from the manual 2 in Japanese by development copy. For common portions, the parts used in the manual 1 in English are used. Then, with regard to the manual 2 in English, an item (e.g., the style of chapter numbers) corresponding to the manual is set. Furthermore, with regard to the manual 2 in English, a translation is input for the separated part. As a result, the corresponding part in English is created.

Next, an operation in the case of managing update history of a manual will be explained.

Figure 17:
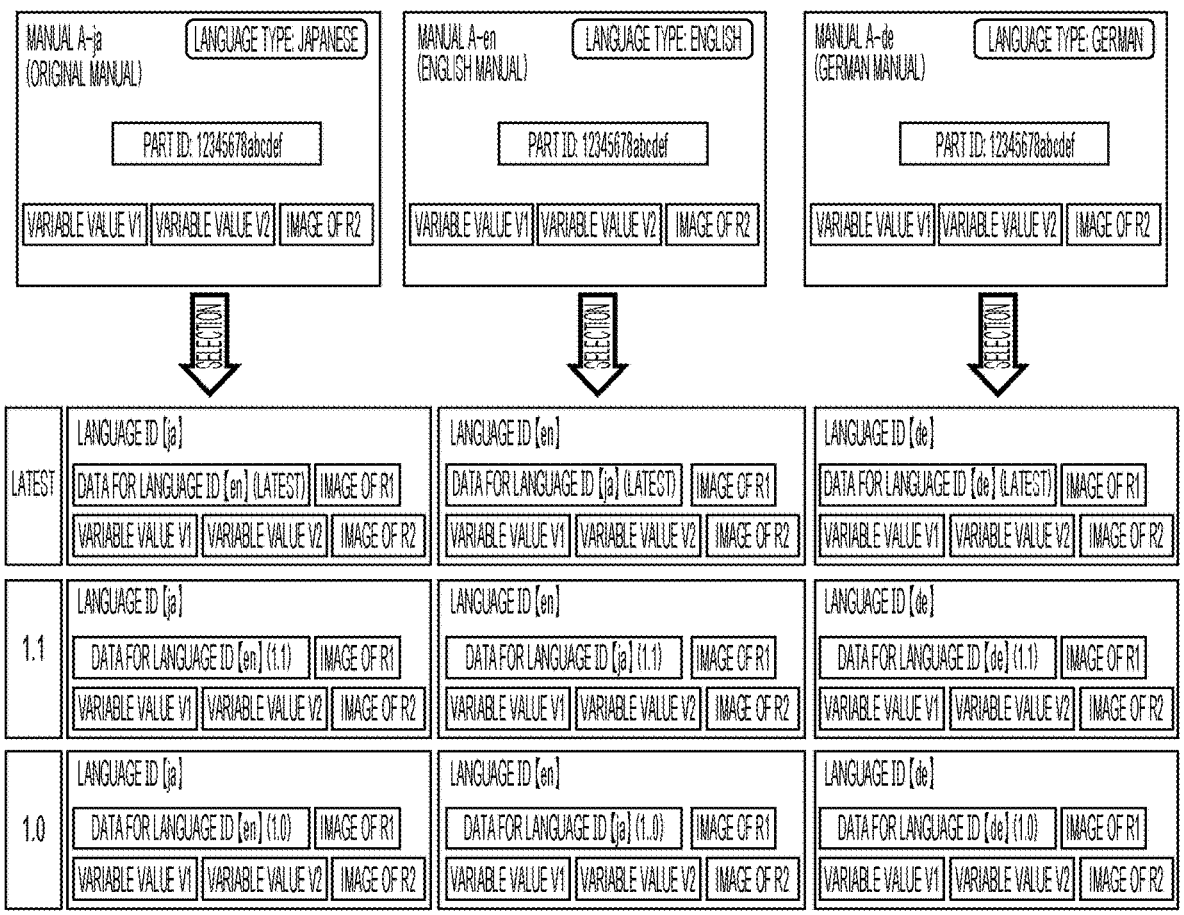
FIG. 17 is a figure illustrating a data structure when managing update history of manuals in Japanese, English, and German.

FIG. 17 is a figure illustrating data structures when managing update history of manuals in Japanese, English, and German.

As illustrated in FIG. 17, with regard to manuals and parts corresponding to multiple languages, update history is created for each language.

Next, an operation in the case of generating a manual will be explained.

Figure 18:
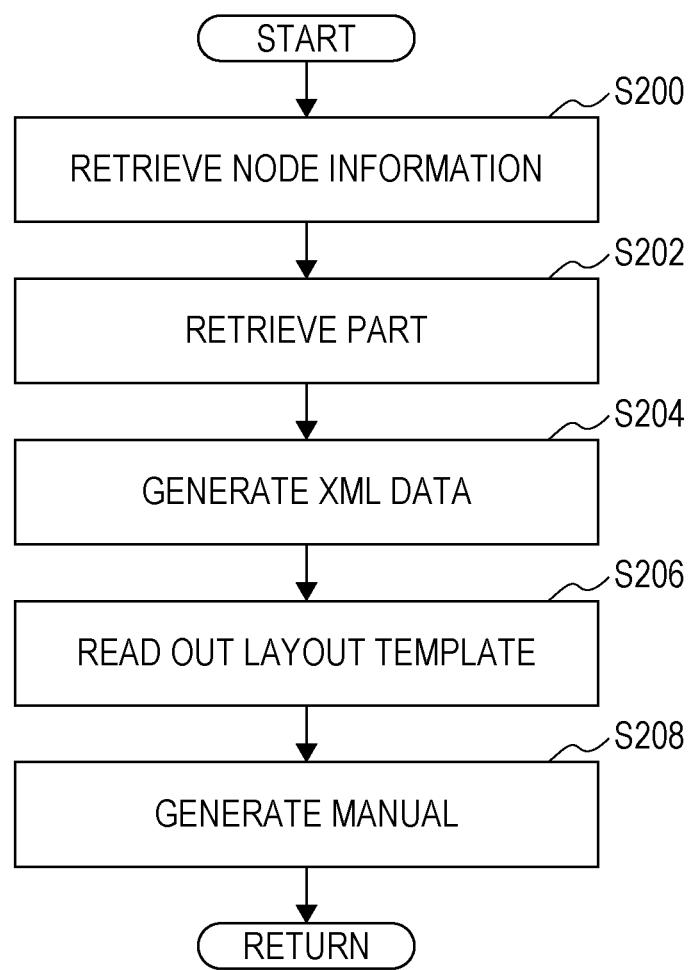
FIG. 18 is a flow chart illustrating manual generation processing.

FIG. 18 is a flow chart illustrating manual generation processing.

When creation of the manual is completed, the user terminal 200 makes a manual generation request to the manual creation support server 100.

Once the manual generation request is made, the CPU 30 activates a prescribed program stored in a prescribed region of the ROM 32, and executes the manual generation processing illustrated in the flow chart of FIG. 18 according to that program.

As illustrated in FIG. 18, once the manual generation processing is executed in the CPU 30, firstly, a shift is made to Step S200.

In Step S200, the node information of the manual to be generated is retrieved from the manual management table 420, and a shift is made to Step S202 in which a part described in the node information is retrieved from the part management table 440 based on the retrieved node information. Then, a shift is made to Step S204.

In Step S204, based on the retrieved node information and part, extensible markup language (XML) data in which the part is structured is generated. Then, a shift is made to Step S206 in which a layout template designated for the manual to be generated is read out from the storage device 42, and a shift is made to Step S208 in which the manual is generated as, for example, a PDF file based on the generated XML data and the readout layout template, thereby completing the series of processing to return to the original processing.

FIG. 19 is a figure for explaining realization of various layouts with a layout template.

As illustrated in FIG. 19, a manual can be generated with various layouts by only designating a layout template.

Next, effects of the present embodiment will be explained.

In the present embodiment, node information of a document in a first language is replicated as node information of a document in a second language, and parts specified in the node information are copied so as to correspond to parts in the second language.

In this manner, translation into the second language can be performed for each of the parts used in the document in the first language. Thus, translation work is facilitated as compared to conventional techniques.

Furthermore, in the present embodiment, when a part is updated, notification related to update is performed concerning parts in other languages corresponding to that part.

In this manner, a part that should be updated can be recognized because, when a part is updated, notification related to the update is performed concerning parts in other languages corresponding to that part. Accordingly, update of the translation can be performed in part units, and translation work is further facilitated.

Furthermore, in the present embodiment, a variable name included in an element is converted into a variable value corresponding to the variable name based on variable information of a document to be generated.

In this manner, with regard to a context that is in common among a plurality of documents, variable values corresponding to the documents can be employed.

Furthermore, in the present embodiment, an image or mathematical formula is obtained from a library based on the replacement character included in the part, and a document is generated based on the obtained image or mathematical formula.

In this manner, one element can be applied to multiple places, and a change in the element is also facilitated.

Furthermore, in the present embodiment, with regard to a part that corresponds to multiple languages, update history is generated for each language.

In this manner, with regard to a part that corresponds to multiple languages, update history of each language can be recognized.

Furthermore, in the present embodiment, a part and an arrangement order or hierarchical relation thereof are edited, and XML data in which the edited part is structured is generated, thereby generating a manual based on the generated XML data and a layout template.

In this manner, since the part and the arrangement order or hierarchical relation thereof can be edited, creation of the manual is facilitated. In addition, since the manual is generated based on the XML data and the layout template, editing can be performed without considering layouts. Thus, manuals of a unified quality can be created regardless of the ability of creators.

Furthermore, in the present embodiment, a part is selected from the part management table 440, and an arrangement order or hierarchical relation of the selected part is incorporated in the node information of the manual management table 420. Then, the part of the part management table 440 is updated, and XML data in which the part is structured is generated based on the part of the part management table 440 and the node information of the manual management table 420, thereby generating a manual based on the generated XML data and a layout template.

In this manner, once the part is selected, the arrangement order or hierarchical relation of the part is incorporated in the node information. Thus, the part can be applied to a plurality of manuals, and creation of a manual is facilitated. In addition, once the part in the part management table 440 is updated, an update content is commonly reflected to the part to be updated in the manuals using the part to be updated. Thus, consistent editing can be performed concerning the manuals. Moreover, since the manual is generated based on the XML data and the layout template, editing can be performed without considering layouts, and manuals of a unified quality can be created regardless of the ability of creators.

Furthermore, in the present embodiment, a function to delete a part in the part management table 440, and a function to delete a description related to a part in the node information of the manual management table 420 without deleting a part in the part management table 440, are provided.

In this manner, with regard to a plurality of manuals using a common part, the parts can be collectively deleted by deleting the part in the part management table 440. In addition, with regard to a plurality of manuals using a common part, the part can be individually deleted from a specific manual among the manuals by deleting a description related to the part in the node information.

Furthermore, in the present embodiment, the node information of a part to be updated is retrieved from the manual management table 420, and based on the retrieved node information, a list of target manuals using the part to be updated is presented.

In this manner, since the list of target manuals is displayed upon change in the content of a part, it is possible to recognize which manual is affected by the update of the part.

In the present embodiment, the storage device 42 corresponds to the part storage means of Invention 1 or 7, the node information storage means of Invention 1 or 7, the template storage means of Invention 1 or 7, the variable information storage means of Invention 4, or the element storage means of Invention 5. In addition, Step S204 corresponds to the structured data generation means of Invention 1 or 7; Step S208 corresponds to the document generation means of Invention 1, 4, 5, or 7; the manual corresponds to the document of Invention 1, 4, 5, or 7; and the XML data corresponds to the structured data of Invention 1 or 7.

In addition, in the present embodiment, the variable name corresponds to the variable identification information of Invention 4; the variable value corresponds to the variable content information of Invention 4; and the replacement character corresponds to the replacement information of Invention 5.

Modification

In the above-described embodiment, when a part is updated, notification related to the update is performed concerning parts in other languages corresponding to that part. However, not limited thereto, update may be promoted in other methods, or parts in other languages may be updated.

In addition, although the above-described embodiment and its modification example are realized as network systems, not limited thereto, they may be realized as a single apparatus or application.

In addition, the above-described embodiment and its modification example explained a case in which a network system consisting of the Internet 199 is employed. However, not limited thereto, for example, what is called an intranet that performs communication by the same system as the Internet 199 may be employed. Needless to say, besides a network performing communication by the same system as the Internet 199, a network of an optional communication system may be employed.

In addition, the above-described embodiment and its modification example explained cases in which the program stored in the ROM 32 in advance is executed when executing the processing illustrated in the flow charts of FIG. 8 and FIG. 18. However, not limited thereto, the RAM 34 may read a program indicating those procedures from a storage medium storing that program, and execute the program.

In addition, in the above-described embodiment and its modification example, the present invention was applied to a case in which a manual is created for each corporation. However, not limited thereto, the present invention can also be applied to other cases without departing from the scope of the present invention. For example, the present invention can be applied to the case of creating a document other than a manual.

DESCRIPTION OF REFERENCE CHARACTERS

100 manual creation support server
200 user terminal
30 CPU
32 ROM
34 RAM
38 I/F
39 bus
40 input device
42 storage device
44 display device
199 the Internet
400 corporate information management table
410 category information management table
420 manual management table
430, 440 part management table
450 image management table
460 mathematical formula management table
470 version management table

The invention claimed is:

1. A document creation support system, comprising:
    a part storage means for storing a part consisting of one or a plurality of elements;
    a node information storage means for storing node information that defines an arrangement order or hierarchical relation of the part for each document;
    a structured data generation means for generating, based on a part of the part storage means and node information of the node information storage means, structured data in which the part is structured;
    a template storage means for storing a layout template that defines a layout of the part;
    a document generation means for generating the document based on the structured data generated by the structured data generation means and the layout template of the template storage means;
    a multi-language development means for replicating node information that defines the arrangement order or hierarchical relation of the part correspondingly to the arrangement order or hierarchical relation defined in the node information of the document in a first language, as the node information of the document in a second language, and replicating the part defined in the node information as a part in the second language; and
    an update management means for, when the part is updated, updating parts in other languages corresponding to the part or performing processing to promote such update.

2. The document creation support system of claim 1, wherein the update management means performs notification related to the update of the parts in the other languages.

3. The document creation support system of claim 1, comprising a variable information storage means for storing variable information that defines variable identification information and variable content information for each document, wherein
    the element includes the variable identification information, and
    the document generation means converts the variable identification information included in the element into the variable content information corresponding to the variable identification information, based on the variable information of the document to be generated among the variable information of the variable information storage means.

4. The document creation support system of claim 1, comprising an element storage means for storing the element, wherein
    the part includes replacement information for identifying the element, and
    the document generation means obtains the element from the element storage means based on the replacement information included in the part, and generates the document based on the obtained element.

5. The document creation support system of claim 1, comprising an update history generation means for generating update history of each language concerning a part corresponding to multiple languages.

\* \* \* \* \*